(12) United States Patent
Nozue et al.

(10) Patent No.: US 9,882,202 B2
(45) Date of Patent: Jan. 30, 2018

(54) POSITIVE ELECTRODE FOR LITHIUM-SULFUR SECONDARY BATTERY AND METHOD OF FORMING THE SAME

(75) Inventors: Tatsuhiro Nozue, Ibaraki (JP); Hirohiko Murakami, Ibaraki (JP)

(73) Assignee: ULVAC, INC., Kanagawa (JP)

( * ) Notice: Subject to any disclaimer, the term of this patent is extended or adjusted under 35 U.S.C. 154(b) by 466 days.

(21) Appl. No.: 13/881,788

(22) PCT Filed: Oct. 14, 2011

(86) PCT No.: PCT/JP2011/005765
§ 371 (c)(1),
(2), (4) Date: Apr. 26, 2013

(87) PCT Pub. No.: WO2012/070184
PCT Pub. Date: May 31, 2012

(65) Prior Publication Data
US 2013/0209880 A1    Aug. 15, 2013

(30) Foreign Application Priority Data
Nov. 26, 2010    (JP) .................................. 2010-263978

(51) Int. Cl.
*H01M 4/1393* (2010.01)
*H01M 4/133* (2010.01)
(Continued)

(52) U.S. Cl.
CPC ......... *H01M 4/1393* (2013.01); *H01M 4/133* (2013.01); *H01M 4/136* (2013.01);
(Continued)

(58) Field of Classification Search
None
See application file for complete search history.

(56) References Cited

U.S. PATENT DOCUMENTS

| 5,457,343 A * | 10/1995 | Ajayan | .................. B82Y 10/00 |
| | | | 257/734 |
| 7,060,390 B2 * | 6/2006 | Chen | ...................... B82Y 30/00 |
| | | | 423/445 R |

(Continued)

FOREIGN PATENT DOCUMENTS

| CN | 1354529 A | 6/2002 |
| CN | 101562244 A | 10/2009 |

(Continued)

OTHER PUBLICATIONS

Zheng et al., "Novel nanosized adsorbing sulfur composite cathode materials for the advanced secondary lithium batteries," Electrochimica Acta 2006; 51: 13301335 (available Aug. 2, 2005).*

(Continued)

*Primary Examiner* — Ula C Ruddock
*Assistant Examiner* — Amanda Barrow
(74) *Attorney, Agent, or Firm* — Cermak Nakajima & McGowan LLP; Tomoko Nakajima

(57) ABSTRACT

Provided are a positive electrode for a lithium-sulfur secondary battery and a method of forming the same, the positive electrode being capable of maintaining battery characteristics such as a specific capacity and a cycling characteristic while achieving a high rate characteristic in particular when being applied to a lithium-sulfur secondary battery. A positive electrode of a lithium-sulfur secondary battery includes a positive electrode current collector and carbon nanotubes grown on a surface of the positive electrode current collector and oriented in a direction orthogonal to the surface. At least the surface of each of the carbon nanotubes is covered with sulfur with a certain interstice left between neighboring ones of the carbon nanotubes.

1 Claim, 4 Drawing Sheets

(51) Int. Cl.
*H01M 4/136* (2010.01)
*H01M 4/1397* (2010.01)
*H01M 4/38* (2006.01)
*H01M 4/66* (2006.01)
*H01M 4/80* (2006.01)
*H01M 10/052* (2010.01)

(52) U.S. Cl.
CPC ........... *H01M 4/1397* (2013.01); *H01M 4/38* (2013.01); *H01M 4/663* (2013.01); *H01M 4/806* (2013.01); *H01M 4/382* (2013.01); *H01M 10/052* (2013.01)

(56) References Cited

U.S. PATENT DOCUMENTS

| | | | | |
|---|---|---|---|---|
| 7,189,476 | B1* | 3/2007 | Macklin | B82Y 30/00 429/212 |
| 8,450,012 | B2* | 5/2013 | Cui | H01M 4/38 252/182.1 |
| 2002/0106561 | A1 | 8/2002 | Lee et al. | |
| 2003/0148187 | A1 | 8/2003 | Yamaguchi et al. | |
| 2004/0058246 | A1 | 3/2004 | Choi et al. | |
| 2004/0241532 | A1 | 12/2004 | Kim | |
| 2006/0057388 | A1* | 3/2006 | Jin | B82B 3/00 428/408 |
| 2006/0192231 | A1* | 8/2006 | Nihei | B82Y 10/00 257/260 |
| 2007/0145356 | A1* | 6/2007 | Amlani | B82Y 10/00 257/40 |
| 2008/0050304 | A1* | 2/2008 | Oya | B82Y 30/00 423/445 R |
| 2009/0015984 | A1* | 1/2009 | Grigorian | H01G 11/36 361/305 |
| 2009/0117468 | A1* | 5/2009 | Eom | B82Y 30/00 429/231.8 |
| 2009/0202644 | A1* | 8/2009 | Gogotsi | B82Y 30/00 424/489 |
| 2010/0117032 | A1* | 5/2010 | Grigorian | B82Y 30/00 252/507 |
| 2010/0178568 | A1* | 7/2010 | Unalan | B82Y 30/00 429/317 |
| 2011/0052998 | A1* | 3/2011 | Liang | C01B 31/12 429/300 |
| 2011/0091773 | A1* | 4/2011 | Wei | C01B 33/035 429/231.8 |
| 2012/0100438 | A1* | 4/2012 | Fasching | H01M 4/133 429/339 |
| 2012/0264017 | A1* | 10/2012 | Nazri | H01M 4/0423 429/218.1 |

FOREIGN PATENT DOCUMENTS

| | | |
|---|---|---|
| CN | 102576878 A | 7/2012 |
| JP | 2004-119367 A | 4/2004 |
| JP | 2005-158305 A | 6/2005 |
| JP | 2007-527099 A | 9/2007 |
| JP | 2010-009837 A | 1/2010 |
| JP | 2010-192367 A | 9/2010 |
| TW | 544962 B | 8/2003 |

OTHER PUBLICATIONS

Dujardin et al., "Capillarity and Wetting of Carbon Nanotubes," Science, vol. 265, 1850-51; Sep. 23, 1994.*
Ji et al., "A highly ordered nanostructured carbon-sulphur cathode for lithium-sulfur batteries," Nature Materials, vol. 8, 500-505, Published Online May 17, 2009.*
Zhang et al., "Enhancement of long stability of sulfur cathode by encapsulating sulfur into micropores of carbon spheres," Energy & Environmental Science, Jun. 2010, 3, 1531-1537.*
Ebbesen, "Wetting, Filling and Decorating Carbon Nanotubes," J. Phys. Chem. Solids, vol. 57, Nov. 6-8, pp. 951-955, 1996 (month unknown).*
International Search Report for PCT Patent App. No. PCT/JP2011/005765 (dated Dec. 27, 2011).
Kobayashi, T., et al., "All solid-state battery with sulfur electrode and thio-LISICON electrolyte," J. Power Sources 2008;182:621-625.
Jeong, S. S., et al., "Electrochemical properties of lithium sulfur cells using PEO polymer electrolytes prepared under three different mixing conditions," J. Power Sources 2007;174:745-750.
Zheng, W., et al., "Novel nanosized adsorbing sulfur composite cathode materials for the advanced secondary lithium batteries," Electrochimica Acta 2006;51:1330-1335.
Zhang, H., et al., "Electrochemical properties of ultra-long, aligned, carbon nanotube array electrode in organic electrolyte," J. Power Sources 2007;172:476-480.
Ji, X., et al., "A highly ordered nanostructured carbon-sulphur cathode for lithium-sulphur batteries," Nature Materials 2009;8:500-506.

* cited by examiner (a)　　　　　　　　　(b)

POSITIVE ELECTRODE FOR LITHIUM-SULFUR SECONDARY BATTERY AND METHOD OF FORMING THE SAME

This application is a national phase entry under 35 U.S.C. § 371 of PCT Patent Application No. PCT/JP2011/005765, filed on Oct. 14, 2011, which claims priority under 35 U.S.C. § 119 to Japanese Patent Application No. 2010-263978, filed Nov. 26, 2010, both of which are incorporated by reference.

TECHNICAL FIELD

The present invention relates to a positive electrode for a lithium-sulfur secondary battery, and a method of forming the same.

BACKGROUND ART

Since lithium secondary batteries have high energy density, the application ranges of lithium secondary batteries are not limited to handheld equipment, such as mobile phones and personal computers, and the like, but are expanded to hybrid automobiles, electric automobiles, electric power storage systems, and the like. As one of such lithium secondary batteries, attention has recently been paid to a lithium-sulfur secondary battery arranged to perform electric charge and discharge through reactions of sulfur and lithium by using the sulfur as a positive electrode active material and the lithium as a negative electrode active material.

The lithium-sulfur secondary battery has an advantage of achieving an improvement of the specific capacity of the lithium-sulfur secondary battery, because at most two lithium ions react with one sulfur atom and sulfur is lighter than transition metals. On the other hand, sulfur is an insulator having extremely high resistance ($5 \times 10^{30}$ Ω·cm). For this reason, it is common practice to mix sulfur with a conductive additive such as acetylene black when the sulfur is used as a positive electrode active material. In case where the acetylene black is mixed with sulfur as described above, high resistance occurs among particles of the acetylene black, whereby the provision of electrons to the sulfur tends to be insufficient. As a result, the utilization efficiency of the sulfur is lowered, which in turn causes a problem in that the specific capacity is limited.

In addition, during electric discharge of a lithium-sulfur secondary battery, cyclic sulfur $S_8$ is broken to form straight chain sulfur $S_8^{2-}$, and this $S_8^{2-}$ is further transformed into $S_6^{2-}$, $S_4^{2-}$, $S_3^{2-}$, $S_2^{2-}$, and $S^{2-}$. These polysulfide anions $S_8^{2-}$ to $S_3^{2-}$ are dissolved in an electrolytic solution, and are diffused in the electrolytic solution. Then, upon reaching a negative electrode, the polysulfide anions react with lithium on the negative electrode to generate lithium sulfide $Li_2S_2$, $Li_2S$. Here, the lithium sulfide is electrochemically inactive. For this reason, once deposited on the negative electrode, the lithium sulfide is not dissolved into the electrolytic solution. Consequently, the lithium-sulfur secondary battery has another problem in that the cycling characteristic is lowered.

As solutions to the foregoing problems, there have been proposed dry polymerization (gelation) in which an electrolytic solution is contained in polymers made of polyethylene oxide (PEO) or the like, or complete solidification using a sulfide solid electrolyte such as Li—P—S or Li—Si—S (see, e.g., Non-Patent Documents 1 and 2). In the above methods, even though the specific capacity and the cycling characteristic are improved, a reaction speed of lithium and sulfur is lower than in the case using the electrolytic solution. As a result, a high rate characteristic cannot be obtained.

Moreover, there has been proposed another method using as a positive electrode active material layer a composite produced by coating a current collector with a slurry in which sulfur is mixed with carbon nanotubes and acetylene black as conductive additives (see, e.g., Non-Patent Document 3). In this method, the carbon nanotubes adsorb polysulfide anions generated during the electric discharge to prevent diffusion of the polysulfide anions into the electrolytic solution, thereby improving the cycling characteristic. However, this method still has a problem in that the resistance occurring among the particles of the acetylene black imposes limitation on the rate characteristic.

PRIOR ART DOCUMENT

Non-Patent Document

Non-Patent Document 1: S. S. Jeong, et al., Journal of Power Sources 174 (2007)
Non-Patent Document 2: T. Kobayashi, et al., Journal of Power Sources 182 (2038) 621
Non-Patent Document 3: W. Zheng, et al., Electrochimica Acta, 51 (2006) 1330

SUMMARY OF THE INVENTION

Problems to be Solved by the Invention

In view of the foregoing points, it is an objective of this invention to provide a positive electrode for a lithium-sulfur secondary battery that is capable of maintaining battery characteristics such as a specific capacity and a cycling characteristic while achieving a high rate characteristic in particular, when the positive electrode is applied to a lithium-sulfur secondary battery, and to provide a method of forming the same.

Means for Solving the Problems

In order to solve the foregoing problems, a positive electrode for a lithium-sulfur secondary battery according to this invention is characterized in that the positive electrode includes a current collector and carbon nanotubes grown on a surface of the current collector and oriented in a direction orthogonal to the surface, and at least a surface of each of the carbon nanotubes is covered with sulfur with a certain interstice left between neighboring ones of the carbon nanotubes. Here, the current collector in this invention includes one in which a catalytic layer is formed on a surface thereof, or one in which a barrier layer and a catalytic layer are formed on a surface thereof.

According to this invention, at least the surface of each of the carbon nanotubes grown on the surface of the current collector is covered with the sulfur, and the sulfur and the carbon nanotubes are in contact with each other in a wide area. Hence, electrons are sufficiently provided to the sulfur. In the case where the positive electrode of this invention is applied to a lithium-sulfur secondary battery, the presence of the interstices between the neighboring carbon nanotubes allows the sulfur and the electrolytic solution to come into contact with each other in a wide area because the electrolytic solution is supplied to the interstices. Thus, the utilization efficiency of sulfur is enhanced, which leads to achievement of a high rate characteristic in particular and further enhancement of the specific capacity, in cooperation with sufficient provision of electrons to the sulfur. As a result, while the battery characteristics such as specific capacity and the cycling characteristic are maintained, the high rate characteristic can be also achieved.

If the sulfur is filled in the inside of each of the carbon nanotubes in this invention, the amount of sulfur in the positive electrode is further increased, which in turn further enhances the specific capacity.

Moreover, in order to solve the foregoing problems, according to this invention, a method of forming a positive electrode for a lithium-sulfur secondary battery is characterized by including the steps of: growing carbon nanotubes directly on a surface of a current collector with the carbon nanotubes oriented in a direction orthogonal to the surface, or growing carbon nanotubes on a surface of a catalytic layer with the carbon nanotubes oriented in one direction and thereafter transferring the carbon nanotubes onto a surface of a current collector with the carbon nanotubes oriented in a direction orthogonal to the surface; placing solid sulfur in an amount depending on a density per unit area of the carbon nanotubes, over an entire region where the carbon nanotubes are grown or transferred; and melting the sulfur to thereby cover the surface of each of the carbon nanotubes with the sulfur with an interstice left between neighboring ones of the carbon nanotubes. Here, in this invention, the solid sulfur includes powdery, granular or tablet sulfur. The amount of such sulfur to be placed is set as needed within such a range that the surface of each of the carbon nanotubes can be covered with the sulfur with an interstice formed between neighboring ones of the carbon nanotubes when the entire sulfur is melted. In addition, the placement of the sulfur includes arranging the solid sulfur to cover the upper surface of the grown carbon nanotubes, or spraying powdery sulfur onto the carbon nanotubes from above.

According to this invention, the solid sulfur in an amount depending on the density per unit area of the carbon nanotubes is merely placed and melted. Thus, such a simple process enables the surface of each of the carbon nanotubes to be covered with the interstice left between the neighboring carbon nanotubes.

In the above case, the carbon nanotubes may be grown at a density of $1 \times 10^{10}$ to $1 \times 10^{12}$ tubes/cm$^2$, and the solid sulfur having a weight of 0.7 to 3 times the weight of the grown carbon nanotubes may be placed.

Moreover, this invention preferably further includes the step of forming an opening at the tip end of each of the carbon nanotubes before placing the sulfur, and it is desirable to fill the sulfur into the inside of each of the carbon nanotubes through the opening when the sulfur is melted. With this process, in the case of filling the sulfur into the inside of the carbon nanotube to further enhance the specific capacity, the filling can be performed at the same time as the covering of the surface of each of the carbon nanotubes with the sulfur. Thus, the productivity is high.

Furthermore, this invention may include the step of performing annealing after the surface of each of the carbon nanotubes is covered with the sulfur such that the annealing makes the sulfur covering the surface of each of the carbon nanotubes permeate the inside of the carbon nanotube, thereby filling the sulfur in the inside of each of the carbon nanotubes.

MODES FOR CARRYING OUT THE INVENTION

Figure 1:
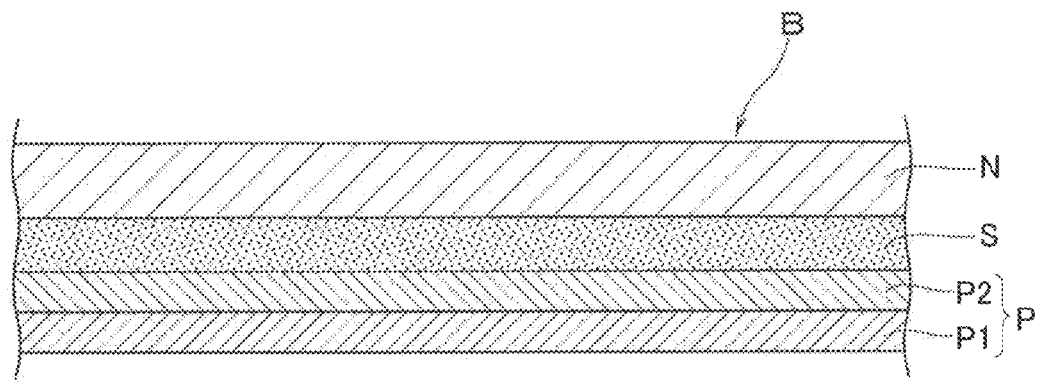
FIG. 1 is a cross sectional view illustrating a schematic structure of a lithium-sulfur secondary battery according to an embodiment of this invention.
Figure 2:
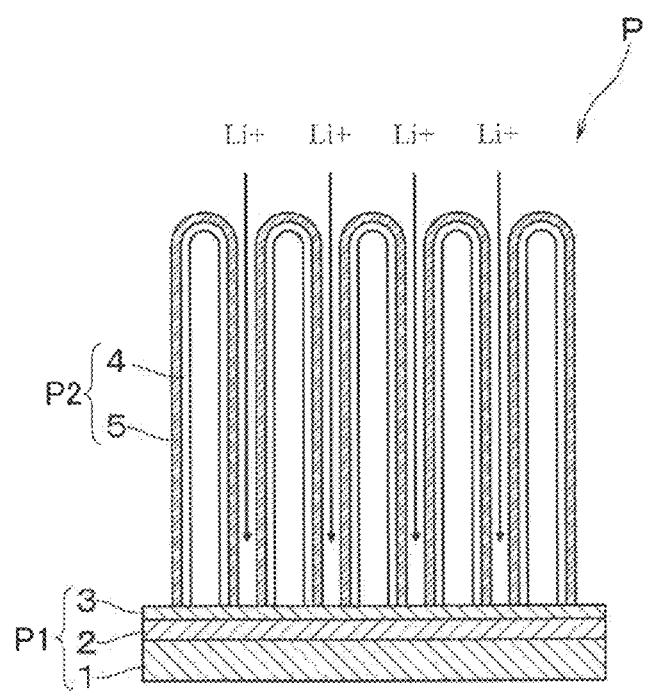
FIG. 2 is a cross sectional view schematically illustrating a positive electrode for a lithium-sulfur secondary battery according to the embodiment of this invention.

As shown in FIG. 1, a lithium-sulfur secondary battery B mainly includes a positive electrode P, a negative electrode N, and a separator S disposed between these positive electrode P and negative electrode N. The separator S contains an electrolytic solution (not illustrated), and is arranged to be capable of transmitting lithium ions (Li+) between the positive electrode P and the negative electrode N via the electrolytic solution. Here, as the negative electrode N, there may be used, for example, Li, an alloy of Li and Al, In, or the like, or hard carbon doped with lithium ions. Then, as the electrolytic solution, there may be used, for example, at least one selected from ether-based electrolytic solutions such as tetrahydrofuran, glyme, diglyme, and tetraglyme, or a mixture of at least one of these (glyme, diglyme, or tetraglyme, for example) with dioxolane for viscosity adjustment. Since well known elements can be used as the other constituent elements other than the positive electrode P, detailed description thereof is omitted herein. Hereinbelow, with reference to FIG. 2, description is made of a positive electrode P for a lithium-sulfur secondary battery according to an embodiment, and a method of forming the same.

The positive electrode P includes a positive electrode current collector P1 and a positive electrode active material layer P2 formed on a surface of the positive electrode current collector P1. The positive electrode current collector P1 includes, for example, a substrate 1, an underlying film (also referred to as "a barrier film") 2 formed on the substrate 1 and having a film thickness of 5 to 50 nm, and a catalytic layer 3 formed on the underlying film 2 and having a film thickness of 0.1 to 5 nm. A foil made of Cu, Ni, or Pt, for example, can be used as the substrate 1. In addition, the underlying film 2 can be formed of an Al film or an AlN film, for example, and the catalytic layer 3 can be formed of a Fe film, a Co film, or a Ni film, for example. Here, the substrate 1, the underlying film 2 and the catalytic layer 3 are not limited to the above ones, and may be formed by using well known methods.

The positive electrode active material layer P2 includes carbon nanotubes 4 grown on a surface of the positive electrode current collector P1 and oriented in a direction orthogonal to the surface, and sulfur 5 covering the entire surface of each of the carbon nanotubes 4 with interstices left between the carbon nanotubes 4. The electrolytic solution is allowed to flow into the interstices. Here, in the case of growing the carbon nanotubes 4, favorable carbon nanotubes have such a high aspect ratio as each having a length within a range of 100 to 500 μm and a diameter within a range of 5 to 50 nm, and it is preferable to grow carbon nanotubes at density per unit area within a range of $1\times10^{10}$ to $1\times10^{12}$ tubes/cm$^2$, for example, in consideration of the battery characteristics. Then, the sulfur 5 covering the entire surface of each of the carbon nanotubes 4 grown as described above preferably has a thickness within a range of 1 to 3 nm, for example.

In this embodiment, since the surface of each of the carbon nanotubes 4 grown on the surface of the positive electrode current collector P1 is covered with the sulfur 5 as described above, the sulfur 5 and the carbon nanotubes 4 are in contact with each other in a wide area. Here, the carbon nanotubes 4 are not ones which have conductivity by using contacts between particles like acetylene black particles used in the aforementioned conventional example, but are ones which each have conductivity alone (or singly), and can sufficiently provide electrons to the sulfur 5. At this time, since an interstice exists between the neighboring carbon nanotubes 4, supply of the electrolytic solution to the interstice also brings the sulfur 5 and the electrolytic solution into contact with each other in the wide area. More specifically, the electrolytic solution (lithium ions) is supplied to the sulfur 5 even in the vicinity of a joint portion with the positive electrode current collector P1, thereby improving the utilization efficiency of the sulfur. This leads to achievement of a high rate characteristic, in particular, in cooperation with sufficient provision of electrons to the sulfur. Further, the specific capacity can be enhanced further. Moreover, the polysulfide anions generated from the sulfur 5 during electric discharge are adsorbed by the carbon nanotubes 4, which suppresses diffusion of the polysulfide anions into the electrolytic solution, thereby leading to a favorable cycling characteristic. As a result, the positive electrode for the lithium-sulfur secondary battery B according to this embodiment maintains battery characteristics such as the specific capacity and the cycling characteristic while having a high rate characteristic in particular.

Figure 3:
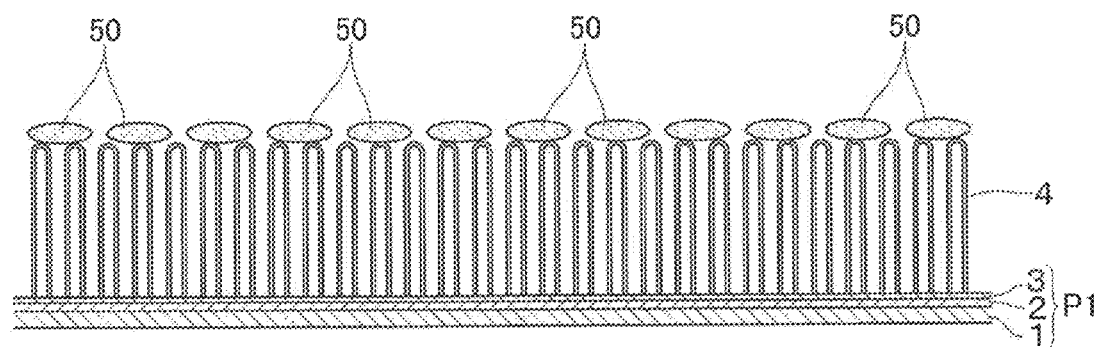
FIG. 3 is a cross sectional view schematically illustrating a method of forming the positive electrode for a lithium-sulfur secondary battery according to the embodiment of this invention.

Next, the method of forming the aforementioned positive electrode P is described with reference to FIG. 3. Firstly, the positive electrode current collector P1 is formed by forming an Al film as the underlying film 2 and a Fe film as the catalytic layer 3 in this order on a surface of a Ni Foil as the substrate 1. Here, the methods of forming the underlying film 2 and the catalytic layer 3 can be implemented by using well known electron beam vapor deposition methods, sputtering methods, and dipping using a solution of a chemical compound containing a catalytic metal, for example. The positive electrode current collector P1 is mounted in a processing chamber of a known CVD apparatus, a mixed gas containing a raw material gas and a diluent gas is supplied into the processing chamber under an operating pressure of 100 Pa to an atmospheric pressure, and the positive electrode current collector P1 is heated to a temperature of 600 to 800° C. In this way, the carbon nanotubes 4 are grown on the surface of the current collector P1 in a manner oriented orthogonal to the surface. Here, the CVD method of growing the carbon nanotubes 4 can be implemented by using a thermal CVD method, a plasma CVD method, or a hot filament method. Hydrocarbon such as methane, ethylene or acetylene, or alcohol such as methanol or ethanol, for example, can be used as the raw material gas, and nitrogen, argon, or hydrogen may be used as the diluent gas. The flow rates of the raw material gas and the diluent gas can be set as needed depending on the capacity of the processing chamber. For example, the flow rate of the raw material gas can be set within a range of 10 to 500 sccm, and the flow rate of the diluent gas can be set within a range of 100 to 5000 sccm.

Subsequently, granular sulfur 50 having a grain size within a range of 1 to 100 μm is sprayed from above onto the entire region where the carbon nanotubes 4 are grown (see FIG. 3). Then, the positive electrode current collector P1 is mounted in a tubular furnace, and is heated to a temperature of 120 to 180° C. that is not less than the melting point of sulfur (113° C.). With this treatment, the melted sulfur flows into spaces between the neighboring carbon nanotubes 4, and the entire surface of each of the carbon nanotubes 4 is covered with the sulfur 5 with the interstices left between the neighboring carbon nanotubes 4 (see FIG. 2). In order to surely leave the interstices between the neighboring carbon nanotubes 4 in this process, the weight of the sulfur 50 to be placed as described above is set depending on the density of the carbon nanotubes 4 (tubes/cm$^2$). For example, in case where the growing density of the carbon nanotubes 4 is $1\times10^{10}$ to $1\times10^{12}$ tubes, the weight of the sulfur 50 is preferably set to be 0.2 to 10 times the weight of the carbon nanotubes 4. The sulfur having a weight of less than 0.2 times fails to evenly cover the surface of each of the carbon nanotubes 4 and the sulfur having a weight of more than 10 times fills up even in the interstices between the neighboring carbon nanotubes 4. To be more specific, in order to cover the surface of each carbon nanotube 4 with the sulfur having a thickness of 1 to 3 nm, it is preferable to set the weight of the sulfur 50 to be 0.7 to 3 times the weight of the carbon nanotubes 4. In addition, when the sulfur is heated in the air, the melted sulfur reacts with water in the air to generate sulfuric acid. For this reason, it is preferable to heat the sulfur in an inert gas atmosphere containing Ar, He, or the like, or in vacuo.

In the method of forming a positive electrode in this embodiment, the solid sulfur 50 in an amount depending on the density per unit area of the carbon nanotubes 4 is merely placed and melted. With such simple process, the surface of each of the carbon nanotubes 4 can be covered with the interstices left between the neighboring carbon nanotubes 4.

Figure 4:
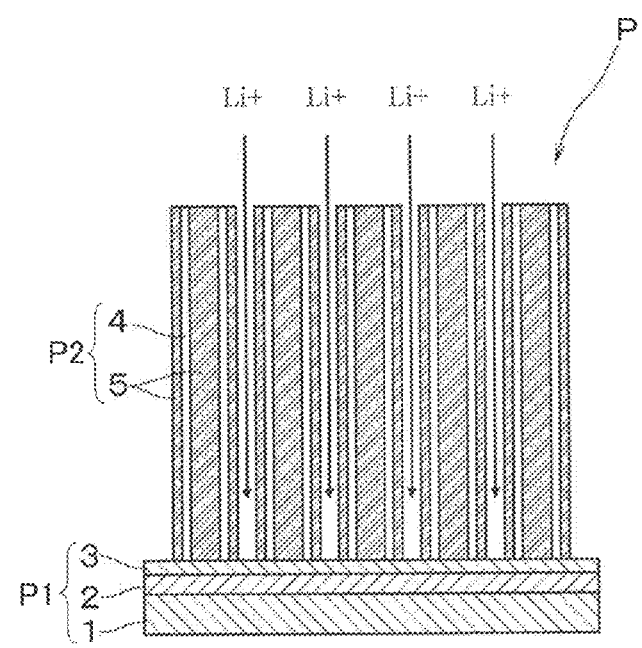
FIG. 4 is a cross sectional view schematically illustrating a modified example of the positive electrode for a lithium-sulfur secondary battery.

In the foregoing embodiment, only the surface of each of the carbon nanotubes 4 is covered with the sulfur 5. However, if the inside of each of the carbon nanotubes 4 is also filled with the sulfur 5 as shown in FIG. 4, a further increase in the amount of the sulfur in the positive electrode P can make the specific capacity further enhanced.

In order to fill the sulfur 5 into the inside of each of the carbon nanotubes 4, an opening is formed at the tip end of the carbon nanotube 4 through heat treatment at a temperature of 500 to 600° C. in the atmosphere, for example, before the sulfur 50 is placed thereon. Then, by using the same methods as in the foregoing embodiment, the sulfur 50 is placed over the entire region where the carbon nanotubes 4 are grown, and the sulfur 50 is melted. With this treatment, the covering of the surface of each of the carbon nanotubes 4 with the sulfur and the filling of the sulfur 5 into the inside of each of the carbon nanotubes 4 through the opening are carried out simultaneously. In this case, the weight of the sulfur 50 is preferably set to be 5 times to 20 times the weight of the carbon nanotubes 4 in order to surely leave the interstices between the neighboring carbon nanotubes.

Instead, in another method, after the surface of each of the carbon nanotubes 4 is covered with the sulfur 5 by melting the sulfur 50 in a tubular furnace, annealing is further performed by using the same tubular furnace at a temperature within a range of 200 to 250° C. at which the current collector metal and the sulfur are unreactive. This annealing makes the sulfur permeate the inside of the carbon nanotube 4 from the surface thereof, and thereby the inside of each of the carbon nanotubes is filled with the sulfur 5.

Example 1

Figure 5:
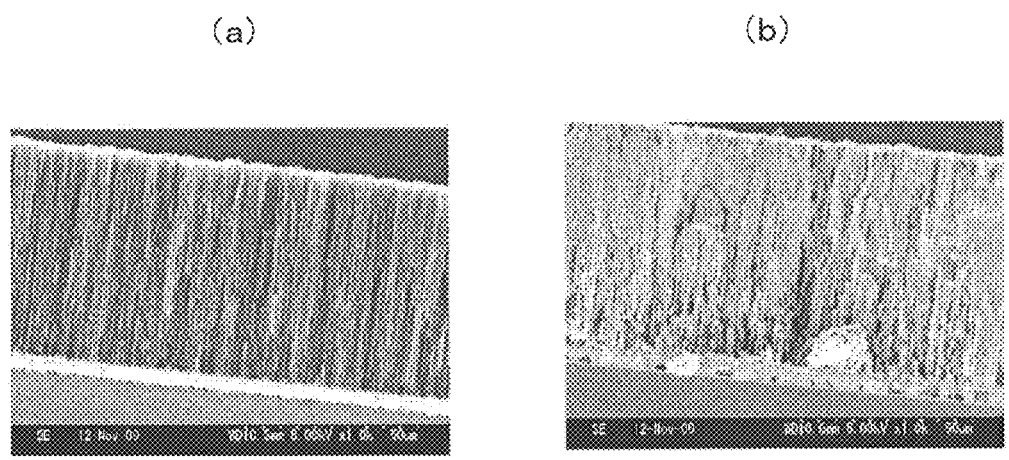
FIG. 5(a) is a cross sectional SEM picture of carbon nanotubes grown in Example 1.
FIG. 5(b) is a cross sectional SEM picture of the carbon nanotubes with their surfaces covered with sulfur in Example 1.

In Example 1, a positive electrode current collector was prepared in which an Al film (underlying film) having a film thickness of 15 nm was formed on a surface of a Ni foil by the electron beam vapor deposition technique, and in which a Fe film having a film thickness of 5 nm was formed on top of the Al film by the electron beam vapor deposition technique. This positive electrode current collector was mounted inside a processing chamber of a thermal CVD apparatus. Then, while acetylene at 200 sccm and nitrogen at 1000 sccm were being supplied to the inside of the processing chamber, carbon nanotubes were grown directly on the surface of the positive electrode current collector (see FIG. 5(a)) under conditions of: operating pressure, 1 atmospheric pressure; temperature, 750° C.; and growing time, 5 minutes. At this time, the density of the carbon nanotubes was $1 \times 10^{10}$ tubes/cm$^2$. The positive electrode current collector was taken out of the thermal CVD apparatus, and the weight of the carbon nanotubes thus grown was determined as 0.50 mg as a result of measurement. Then, the workpiece in which granular sulfur ($S_8$) having a weight of 10 times (5 mg) the weight of the carbon nanotubes was placed over the entire region where the carbon nanotubes were grown was mounted inside a tubular furnace, and was heated at 120° C. for five minutes in an Ar atmosphere. A cross sectional SEM picture of the carbon nanotubes after the heating is illustrated in FIG. 5(b). From this picture, it was confirmed that the surface of each of the carbon nanotubes was covered with the sulfur having a thickness of 5 nm with the interstices left between the neighboring carbon nanotubes.

Example 2

In Example 2, carbon nanotubes were grown on a surface of a positive electrode current collector by the same method as in Example 1 described above. Then, by the same methods as in Example 1 described above, the workpiece in which granular sulfur having a weight (2.5 mg) of 5 times the weight (0.5 mg) of the carbon nanotubes was placed was mounted inside the tubular furnace, and was heated at 120° C. for five minutes in an Ar atmosphere. It was confirmed that the surface of each of the carbon nanotubes after the heating was covered with the sulfur having a thickness of 5 nm. Thereafter, annealing was performed at 230° C. for 30 minutes in an Ar atmosphere in the same tubular furnace. It was confirmed that the sulfur on the surface of the carbon nanotubes permeated the insides of the carbon nanotubes through this annealing, and that the insides of the carbon nanotubes were also filled with the sulfur. Here, since 66% (1.55 g) of the sulfur was evaporated during the annealing, the weight ratio of the carbon nanotubes and the sulfur was 1:1.9 in the positive electrode finally obtained in Example 2.

Next, a coin cell of a lithium-sulfur secondary battery (this invention) was fabricated by using the positive electrode formed in Example 2 and having a diameter of 14 mmφ, and by using a metallic lithium piece having a diameter of 14 mmφ and a thickness of 1 mm as the negative electrode. To be more specific, the positive electrode and the negative electrode were disposed to be opposed to each other across a separator (for example, the trade name "2400," manufactured by Celgard, LLC), and a mixed solution of 1M lithium bis(trifluoromethylsulfonate)imide (LiTFSI), glyme (DME) and dioxolane (DOL) (DME: DOL=9:1) was used as the electrolytic solution. Then, the discharge capacity per gram (specific capacity) was measured.

Figure 6:
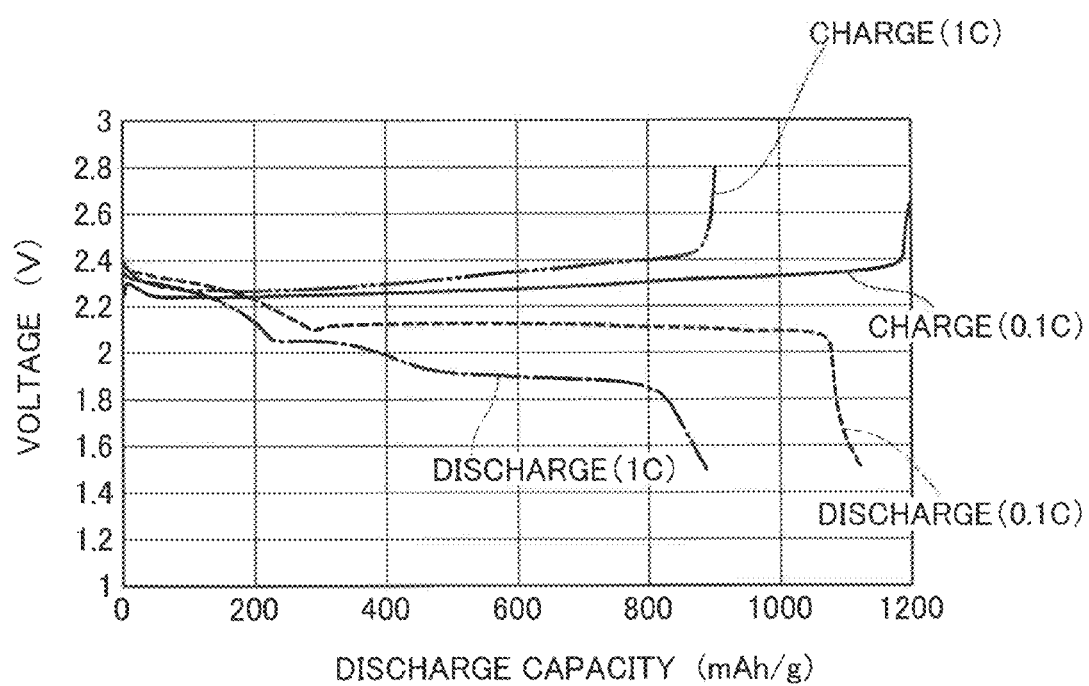
FIG. 6 is a graph illustrating charge and discharge characteristics of a lithium-sulfur secondary battery using a positive electrode obtained in Example 2.

FIG. 6 is a graph illustrating charge and discharge characteristics of the lithium-sulfur secondary battery (this invention) using the positive electrode obtained in Example 2. In this case, the measurement was made with a cut-off voltage for discharge set to 1.5V, a cut-off voltage for charge set to 2.8V, and a charge/discharge rate set to 0.1 C and 1 C. In the first discharge at 0.1 C rate, a high discharge capacity of 1120 mAh/g at a potential of 2.5 to 1.5V was obtained. In addition, in the first charge and discharge at 1 C rate, a high discharge capacity of 870 mAh/g was obtained, which is equivalent to approximately 80% of the discharge capacity at 0.1 C rate. It is apparent that Example 2 maintained battery characteristics such as the specific capacity and the cycling characteristic while obtaining a high rate characteristic in particular, as described above. This is because electrons and lithium ions (the electrolytic solution) can be sufficiently provided to the sulfur, thereby increasing the utilization efficiency of the sulfur to approximately 100%. In addition, since the polarization at 1 C rate (a potential difference between charge and discharge) is as small as 0 to 0.5 V, it is obvious that the electrode can be made to have a lower resistance.

Here, as Comparative Experiment 1, carbon nanotubes were grown on a surface of a positive electrode current collector by the same method as in Example 1 described above. Subsequently, by the same methods as in Example 1 described above, the workpiece in which granular sulfur having a weight (20 mg) of 40 times the weight (0.50 mg) of the carbon nanotubes was placed was mounted inside the tubular furnace, and was heated at 120° C. for five minutes in an Ar atmosphere. In the resultant workpiece, the sulfur was filled in the spaces between the neighboring carbon nanotubes. Thereafter, by the same method as in Example 2, annealing was performed at 230° C. for 30 minutes in an Ar atmosphere in the same tubular furnace. It was confirmed that, although the insides of the carbon nanotubes were filled with the sulfur through this annealing, the sulfur were still filled in the spaces between the neighboring carbon nanotubes. Here, since 27.5% (5.5 mg) of the sulfur was evaporated during the annealing, the weight ratio of the carbon nanotube and the sulfur was 1:29 in the positive electrode finally obtained in Comparative Experiment 1. Then, a coin cell of a lithium-sulfur secondary battery (Comparative Product 1) was fabricated by using the positive electrode thus obtained in the same manner as in Example 2 described above, and the discharge capacity per gram was measured.

Figure 7:
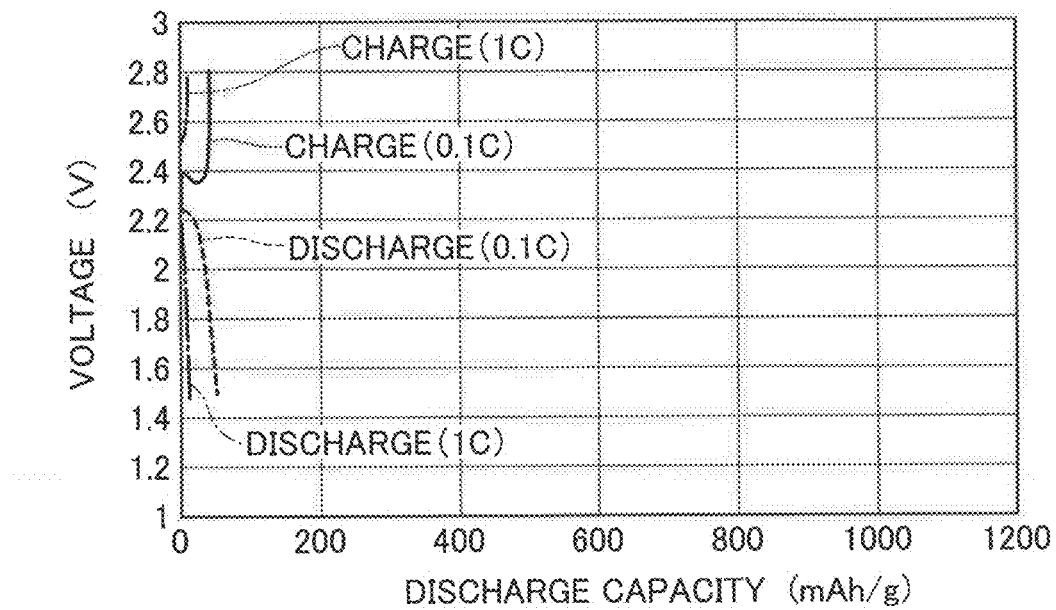
FIG. 7 is a graph illustrating charge and discharge characteristics of Comparative Product 1.

FIG. 7 is a graph illustrating charge and discharge characteristics of Comparative Product 1. The conditions for measuring the discharge capacity were set to be the same as in Example 2 described above. In charge and discharge at 0.1 C rate, only a small discharge capacity of 50 mAh/g was obtained. Also, in charge and discharge at 1 C rate, only an extremely small discharge capacity of 11 mAh/g was obtained which is equivalent to approximately 20% of the discharge capacity at 0.1 C rate. A reason why the discharge capacity of Comparative Product 1 is smaller than that of the product of this invention is considered to be due to a low utilization efficiency of the sulfur, which results from a phenomenon in which the electrolytic solution can come into contact with only a very small amount of sulfur around the tip ends of the carbon nanotubes because the sulfur is filled in the spaces between the carbon nanotubes filled with the sulfur.

As another Comparative Experiment 2, a positive electrode was fabricated by using the conventional method. Specifically, sulfur and acetylene black were measured at a weight ratio of 1:1, and were mixed by a ball mill. To the mixture, polyvinylidene difluoride (PVdF) that functions as a binder was added. The mixture to which the polyvinylidene difluoride was added was dissolved into N-methyl-2-pyrrolidone (NMP) to form a slurry (solution) with high viscosity. The slurry was applied with a uniform thickness (for example, 50 μm) to a surface of a positive electrode current collector (for example, a Ni foil) by using an applicator. In this case, the weight ratio of sulfur:acetylene black:polyvinylidene difluoride was set to 45:45:10. Subsequently, the positive electrode current collector coated with the solution was dried at 80° C. for 60 minutes in the atmosphere, and was punched into a piece having a diameter of 14 mmφ. Here, the weight of the sulfur was 1.90 mg in the positive electrode finally obtained in Comparative Experiment 2. Then, a coin cell of a lithium-sulfur secondary battery (Comparative Product 2) was fabricated by using the positive electrode thus obtained in the same manner as in foregoing Example 2, and the discharge capacity per gram was measured.

Figure 8:
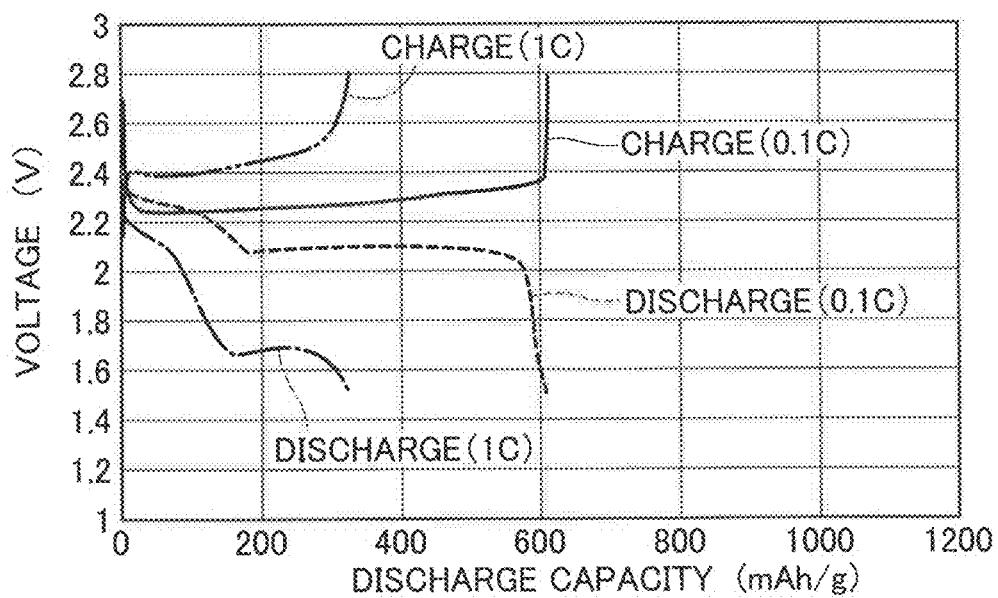
FIG. 8 is a graph illustrating charge and discharge characteristics of Comparative Product 2.

FIG. 8 is a graph illustrating charge and discharge characteristics of Comparative Product 2. The conditions for measuring the discharge capacity were set to be the same as in Example 2 described above. In the first discharge at 0.1 C rate, a discharge capacity of 610 mAh/g at a potential of 2.5 to 1.5V was obtained. In addition, in the charge and discharge at 1 C rate, a discharge capacity of 320 mAh/g was obtained, which is equivalent to approximately 50% of the discharge capacity at 0.1 C rate. A reason why the discharge capacity of Comparative Product 2 is smaller than that of the product of this invention is due to a low utilization efficiency of sulfur, which results from a phenomenon in which electrons are insufficiently provided to the sulfur due to a high resistance occurring among the particles of the acetylene black.

Hereinabove, the embodiment and examples of this invention have been described. However, this invention is not limited to those described above. Although this invention has been described by taking as an example a case where the carbon nanotubes are grown directly on the surface of the current collector (that is, the catalytic layer), the carbon nanotubes may be grown in an oriented manner on a surface of another catalytic layer, and these carbon nanotubes may be transferred onto the surface of the current collector.

EXPLANATION OF REFERENCE NUMERALS

B . . . lithium-sulfur secondary battery, P . . . positive electrode, P1 . . . positive electrode current collector, 4 . . . carbon nanotube, 5 . . . sulfur, 50 . . . solid sulfur.

The invention claimed is:

1. A positive electrode for a lithium-sulfur secondary battery comprising:
 a current collector; and
 first and second carbon nanotubes disposed on a surface of the current collector and oriented in a direction orthogonal to the surface, the first carbon nanotube neighboring the second carbon nanotube,
 each of the first and second carbon nanotubes having a first end in contact with the current collector, a second end opposite the first end, an opening at the second end, and a cylindrical outer surface between the first and the second end,
 wherein each of the cylindrical outer surfaces of each of the first and second carbon nanotubes is covered with sulfur with a certain interstice left between the first and second carbon nanotubes,
 wherein each of the second ends of the first and second carbon nanotubes are coplanar with an end surface of the respective sulfur on the cylindrical outer surfaces thereof at the respective second ends,
 and wherein additional sulfur is filled in the inside of each of the first and second carbon nanotubes in an entire longitudinal length thereof until each of the respective openings.

* * * * *